US012592820B2

(12) United States Patent
Shachar et al.

(10) Patent No.: US 12,592,820 B2
(45) Date of Patent: Mar. 31, 2026

(54) SYSTEMS AND METHODS FOR DIGITAL RETIREMENT OF INFORMATION HANDLING SYSTEMS

(71) Applicant: Dell Products, L.P., Round Rock, TX (US)

(72) Inventors: Tomer Shachar, Beer-Sheva (IL); Maxim Balin, Gan Yavne (IL); Yevgeni Gehtman, Modi'in (IL)

(73) Assignee: Dell Products L.P., Round Rock, TX (US)

( * ) Notice: Subject to any disclaimer, the term of this patent is extended or adjusted under 35 U.S.C. 154(b) by 243 days.

(21) Appl. No.: 18/056,885

(22) Filed: Nov. 18, 2022

(65) Prior Publication Data

US 2024/0171392 A1 May 23, 2024

(51) Int. Cl.
*H04L 9/08* (2006.01)
*G06F 21/60* (2013.01)
*H04L 9/32* (2006.01)

(52) U.S. Cl.
CPC ............ *H04L 9/0897* (2013.01); *G06F 21/60* (2013.01); *H04L 9/321* (2013.01)

(58) Field of Classification Search
CPC ......... H04L 9/088; H04L 9/0891–0897; H04L 9/321–3218; G06F 21/60–645
See application file for complete search history.

(56) References Cited

U.S. PATENT DOCUMENTS

| | | | | |
|---|---|---|---|---|
| 10,185,508 | B1* | 1/2019 | Farhan | ..................... G06F 8/654 |
| 11,641,310 | B1* | 5/2023 | Kath | ................... H04L 41/0613 |
| | | | | 709/223 |
| 2008/0022412 | A1* | 1/2008 | Challener | ............... G06F 21/62 |
| | | | | 726/27 |
| 2014/0025947 | A1* | 1/2014 | Jaber | ..................... G06F 21/572 |
| | | | | 713/164 |
| 2014/0372743 | A1* | 12/2014 | Rogers | .................. H04L 9/3234 |
| | | | | 713/155 |
| 2017/0039388 | A1* | 2/2017 | Vas | ........................ H04L 63/107 |
| 2019/0362080 | A1* | 11/2019 | Achillopoulos | ........ G06F 21/72 |
| 2021/0357144 | A1* | 11/2021 | Strong | .................... G06F 3/062 |

OTHER PUBLICATIONS

Gottipati, Padmini. "Information security considerations for cloud-based Enterprise Resource Planning system and best practices for its retirement phase." (2020). (Year: 2020).*

* cited by examiner

*Primary Examiner* — Madhuri R Herzog

(74) *Attorney, Agent, or Firm* — Fogarty LLP

(57) ABSTRACT

Digital retirement of an IHS may include encrypting, by the IHS, data on the IHS, using an encryption key stored in a trusted platform module (TPM) of the IHS, and incapacitating the TPM. This encryption key may be a (unique (256-bit encryption)) data sanitization key stored protected inside the TPM, thereby, the encryption key is protected inside the TPM by being immutable and unreadable by external devices. Digital retirement of the IHS may also include verifying all data on the IHS is encrypted successfully, prior to incapacitating the TPM. Incapacitation of the TPM may be carried out by instructing a power supply of the IHS to overvolt the TPM. Digital retirement of the IHS may be carried out in response to receipt of a digital retirement command that has been authorized and/or authenticated through two users and may be further manually approved by a third authorized and/or authenticated user.

20 Claims, 3 Drawing Sheets

100

115 — SYSTEM MEMORY

115a — MEMORY MODULE

⋮

115n — MEMORY MODULE

120

125 — CHIPSET

105 — PROCESSOR(S)

110 — MEMORY CONTROLLER

130

135 — BMC

150 — I/O PORTS

140 — NETWORK CONTROLLER

170 — POWER MANAGEMENT

175 — POWER SUPPLY

145a — STORAGE DEVICES(S)

⋮

145n — STORAGE DEVICES(S)

155 — FFGA CARD

160 — STORAGE CONTROLLER

165 — GRAPHICS PROCESSOR(S)

SYSTEMS AND METHODS FOR DIGITAL RETIREMENT OF INFORMATION HANDLING SYSTEMS

CROSS REFERENCE

This application is related to U.S. Patent Application Serial Number, entitled Verification and/or Validation of Unreversible Information Handling System Commands, filed concurrent herewith, on Nov. 18, 2022, and which is incorporated herein by reference.

FIELD

This disclosure relates generally to Information Handling Systems (IHSs), and, more specifically, to systems and methods for (remote) digital retirement of IHSs.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

An IHS, as every electronic device, has a limited lifetime, and secured retirement of such IHSs is one of the concerns of modern organizations. In the case of IHS servers, or the like, such secure retirement is particularly important since IHS servers, or the like, of an enterprise may be spread all over the world and be installed in environments outside the reach of professional Information Technology (IT) engineers, or the like. After an IHS reaches its "End-Of-Life" in the organizational ecosystem, the IHS may be placed "Out-Of-Service." However, in such a case residual data may still be on the out-of-service IHS, such as: Personally Identifiable Information (PII), other sensitive information, security keys, etc. This residual data and security keys should not stay accessible to potential attackers, post-retirement, at the end-of-life of the IHS. An additional concern is that potential attackers may use the retired IHS as a "rogue device."

There are different typical techniques of IHS sanitization. These data sanitization methods have different techniques and typically require human interaction. Typically, every organization IHS may be assigned an official retiring process of the IHS server, or the like device. Typically, this approach which, may be implemented, such as with respect to sever IHSs, in a typical data center, or the like primarily comprises the following.

Destroying the IHS, via user physical intervention and physical user actions, such as opening the IHS and removing (hard) drive(s), memory, a Trusted Platform Module (TPM), etc. This process is vulnerable to human error, or other "human factors" that may influence the efficiency of the procedure, and such processes lack absolute certainty that IHS data cannot be recovered (even partially).

Another typical process for IHS retirement may employ data masking, or the like. However, even with data masking overwriting data several times, the data (or a portion of it) may still be recovered. Also, with data masking IHS retirement processes the IHS's TPM could still include sensitive information, for example, (encryption) keys, certificates, etc., which may be used by potential attackers.

Other typical processes for IHS retirement may employ cryptographic erasure. In such IHS retirement processes, an application encrypts IHS data. However, an encryption key is still stored somewhere (on the IHS, such as in the IHSs TPM). Thus, the enterprise cannot verify that the public key is permanently destroyed.

Existing approaches to IHS retirement is to give the IHS to an enterprise (a company) that performs IHS sanitization(s). Under such an approach the IHS gets out of the owner's and into the hands of this third party, which presents (a) further risk(s), and potential threat(s), in that the owner cannot assure that the third party has performed its own checks on (e.g., monitors) extracting the data, or even that (someone associated with) the third party company will not publish or sell the data.

SUMMARY

Embodiments of systems and methods for digital retirement of Information Handling Systems (IHSs) are described. In an illustrative, non-limiting example, digital retirement of an IHS includes encrypting, by the IHS, data on the IHS, using an encryption key stored in a trusted platform module (TPM) of the IHS, and incapacitating the TPM. This encryption key may be a (unique (256-bit encryption)) data sanitization key stored protected inside the TPM, thereby, the encryption key is protected inside the TPM by being immutable and unreadable by external devices. Digital retirement of the IHS may also include verifying all data on the IHS is encrypted successfully, prior to incapacitating the TPM. Incapacitating the TPM may be carried out by instructing a power supply of the IHS to overvolt the TPM.

The digital retirement of the IHS may be carried out in response to receipt of a digital retirement command. For example, a remote access controller, or the like, (of another IHS) may receive selection of the IHS for digital retirement. The first user may then be authorized and/or authenticated, by the remote access controller, or the like. The remote access controller may then request a second user approve the selection of the IHS for digital retirement. This second user may then be authorized and/or authenticated, by the remote access controller, or the like, and the remote access controller, or the like may then send the digital retirement command to the IHS to be retired, in response to approval of the selection of the IHS for digital retirement by the second user.

In some implementations, the IHS (to be retired) may determine, if manual approval of digital retirement of the IHS is called for. In response to a determination that manual approval of digital retirement of the IHS is required, the third user may then be authorized and/or authenticated, by the remote access controller, or the like. Encryption of the data on the IHS using the encryption key stored in the TPM and the subsequent incapacitation of the TPM may then be carried out, in response to receipt, by the IHS, of manual approval of digital retirement of the information handling from the third user.

Thusly, components of a system for digital retirement of an IHS, may include a TPM incorporated into the IHS that stores an immutable unique data sanitization key unreadable by external devices, and a remote access controller, or the like, which may be integrated into the IHS. This remote access controller, or the like, may be configured to, encrypt data on the IHS, using the unique data sanitization key, in response to receipt of a digital retirement command, and incapacitate the TPM. In such IHSs, the unique (256-bit encryption) data sanitization key may be stored in the TPM at time of manufacture of the IHS or at time of manufacture of the TPM.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

For purposes of this disclosure, an "Information Handling System" (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, touchscreen and/or a video display. The IHS may also include one or more buses operable to transmit communications between the various hardware components. A more detailed example of an IHS is described with respect to FIG. 1.

Figure 1:
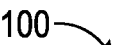
FIG. 1 is a block diagram illustrating components of an example of an Information Handling System (IHS), according to some embodiments.

FIG. 1 is a block diagram illustrating components of example IHS 100, according to some embodiments. IHS 100 may utilize one or more processors 105. In some embodiments, processors 105 may include a main processor and a co-processor, each of which may include a plurality of processing cores that, in certain scenarios, may each be used to run an instance of a server process. In certain embodiments, one or all of processor(s) 105 may be graphics processing units (GPUs) in scenarios where IHS 100 has been configured to support functions such as multimedia services and graphics applications.

As illustrated, processor(s) 105 includes an integrated memory controller 110 that may be implemented directly within the circuitry of the processor 105, or the memory controller 110 may be a separate integrated circuit that is located on the same die as the processor 105. The memory controller 110 may be configured to manage the transfer of data to and from the system memory 115 of the IHS 105 via a high-speed memory interface 120. The system memory 115 is coupled to processor(s) 105 via a memory bus 120 that provides the processor(s) 105 with high-speed memory used in the execution of computer program instructions by the processor(s) 105. Accordingly, system memory 115 may include memory components, such as static RAM (SRAM), dynamic RAM (DRAM), NAND Flash memory, suitable for supporting high-speed memory operations by the processor(s) 105. In certain embodiments, system memory 115 may combine both persistent, non-volatile memory and volatile memory.

In certain embodiments, the system memory 115 may be comprised of multiple removable memory modules. The system memory 115 of the illustrated embodiment includes removable memory modules 115*a-n*. Each of the removable memory modules 115*a-n* may correspond to a printed circuit board memory socket that receives a removable memory module 115*a-n*, such as a DIMM (Dual In-line Memory Module), that can be coupled to the socket and then decoupled from the socket as needed, such as to upgrade memory capabilities or to replace faulty memory modules. Other embodiments of IHS memory 115 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 100 may utilize chipset 125 that may be implemented by integrated circuits that are coupled to processor(s) 105. In this embodiment, processor(s) 105 is depicted as a component of chipset 125. In other embodiments, all of chipset 125, or portions of chipset 125 may be implemented directly within the integrated circuitry of processor(s) 105. The chipset may provide the processor(s) 105 with access to a variety of resources accessible via one or more buses 130. Various embodiments may utilize any number of buses to provide the illustrated pathways served by bus 130. In certain embodiments, bus 130 may include a PCIe switch fabric that is accessed via a PCIe root complex.

As illustrated, IHS 100 includes Baseboard Management Controller (BMC) 135 to provide capabilities for remote monitoring and management of various aspects of IHS 100. In support of these operations, BMC 135 may utilize both in-band, sideband and/or out of band communications with certain managed components of IHS 100, such as, for example, processor(s) 105, system memory 115, chipset 125, network controller 140, storage device(s) 145, etc. BMC 135 may be installed on the motherboard of IHS 100 or may be coupled to IHS 100 via an expansion slot provided by the motherboard. As a non-limiting example of a BMC, the integrated Dell Remote Access Controller (iDRAC) from Dell® is embedded within Dell PowerEdge™ servers and provides functionality that helps information technology (IT) administrators deploy, update, monitor, and maintain servers remotely. BMC 135 may include non-volatile memory having program instructions stored thereon that are usable by CPU(s) 105 to enable remote management of IHS 100. For example, BMC 135 may enable a user to discover, configure, and manage BMC 135, setup configuration options, resolve and administer hardware or software problems, etc. Additionally, or alternatively, BMC 135 may include one or more firmware volumes, each volume having one or more firmware files used by the BIOS' firmware interface to initialize and test components of IHS 100.

IHS 100 may also include the one or more I/O ports 150, such as USB ports, PCIe ports, TPM (Trusted Platform Module) connection ports, HDMI ports, audio ports, docking ports, network ports, Fibre Channel ports and other storage device ports. Such I/O ports 150 may be externally accessible or may be internal ports that are accessed by opening the enclosure of IHS 100. Through couplings made to these I/O ports 150, users may couple IHS 100 directly to other IHSs, storage resources, external networks and a vast variety of peripheral components.

As illustrated, IHS 100 may include one or more FPGA (Field-Programmable Gate Array) cards 155. Each of the FPGA card 155 supported by IHS 100 may include various processing and memory resources, in addition to an FPGA logic unit that may include circuits that can be reconfigured after deployment of IHS 100 through programming functions supported by the FPGA card 155. Through such reprogramming of such logic units, each individual FGPA card 155 may be optimized to perform specific processing tasks, such as specific signal processing, security, data mining, and artificial intelligence functions, and/or to support specific hardware coupled to IHS 100. In some embodiments, a single FPGA card 155 may include multiple FPGA logic units, each of which may be separately programmed to implement different computing operations, such as in computing different operations that are being offloaded from processor 105.

IHS 100 may include one or more storage controllers 160 that may be utilized to access storage devices 145*a-n* that are accessible via the chassis in which IHS 100 is installed. Storage controller 160 may provide support for RAID (Redundant Array of Independent Disks) configurations of logical and physical storage devices 145*a-n*. In some embodiments, storage controller 160 may be an HBA (Host Bus Adapter) that provides more limited capabilities in accessing physical storage devices 145*a-n*. In some embodiments, storage devices 145*a-n* may be replaceable, hot-swappable storage devices that are installed within bays provided by the chassis in which IHS 100 is installed. In embodiments where storage devices 145*a-n* are hot-swappable devices that are received by bays of chassis, the storage devices 145*a-n* may be coupled to IHS 100 via couplings between the bays of the chassis and a midplane of IHS 100. In some embodiments, storage devices 145*a-n* may also be accessed by other IHSs that are also installed within the same chassis as IHS 100. Storage devices 145*a-n* may include SAS (Serial Attached SCSI) magnetic disk drives, SATA (Serial Advanced Technology Attachment) magnetic disk drives, solid-state drives (SSDs) and other types of storage devices in various combinations.

Processor(s) 105 may also be coupled to a network controller 140 via bus 130, such as provided by a Network Interface Controller (NIC) that allows the IHS 100 to communicate via an external network, such as the Internet or a LAN. In some embodiments, network controller 140 may be a replaceable expansion card or adapter that is coupled to a motherboard connector of IHS 100. In some embodiments, network controller 140 may be an integrated component of IHS 100.

In certain embodiments, IHS 100 may operate using a BIOS (Basic Input/Output System) that may be stored in a non-volatile memory accessible by the processor(s) 105. The BIOS may provide an abstraction layer by which the operating system of the IHS 100 interfaces with the hardware components of the IHS. Upon powering or restarting IHS 100, processor(s) 105 may utilize BIOS instructions to initialize and test hardware components coupled to the IHS, including both components permanently installed as components of the motherboard of IHS 100, and removable components installed within various expansion slots supported by the IHS 100. The BIOS instructions may also load an operating system for use by the IHS 100. In certain embodiments, IHS 100 may utilize Unified Extensible Firmware Interface (UEFI) in addition to or instead of a BIOS. In certain embodiments, the functions provided by a BIOS may be implemented, in full or in part, by the remote access controller 135. In some embodiments, BIOS may be configured to identify hardware components that are detected as being currently installed in IHS 100. In such instances, the BIOS may support queries that provide the described unique identifiers that have been associated with each of these detected hardware components by their respective manufacturers. In providing an abstraction layer by which hardware of IHS 100 is accessed by an operating system, BIOS may identify the I/O ports 150 that are recognized and available for use.

In some embodiments, IHS 100 may include a TPM (Trusted Platform Module) that may include various registers, such as platform configuration registers, and a secure storage, such as an NVRAM (Non-Volatile Random-Access Memory). The TPM, which may be (a part of) a TPM controller chip, or the like, which may, in turn be a part of the BIOS and/or chipset 125, may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 100. These calculated hash values may then be compared against reference hash values that were previously stored in a secure non-volatile memory of the IHS, such as during factory provisioning of IHS 100. In this manner, a TPM may establish a root-of-trust that includes core components of IHS 100 that are validated as operating using instructions that originate from a trusted source. A TPM may contain sensitive information such as storage keys, Storage-Root-Keys (SRKs), Platform-Configuration-Registers (PCR), Endorsement-Key (EK), Attestation Identity Keys (AIKs), etc. Typical TPM reset functionality is limited to clearing owner authorization values and keys stored in the TPM. However, some keys, such as an AIK, are not affected by a TPM reset.

A variety of additional components may be coupled to processor(s) 105 via bus 130. In certain embodiments, a graphics processor 165 may be comprised within one or more video or graphics cards, or an embedded controller, installed as components of the IHS 100. Processor(s) 105 may also be coupled, such as via bus 130 and chipset 125, to power management unit 170 that may interface with power supply 175 of IHS 100. Therethrough, power supply 175 may have a unique connection to IHS 100's TPM, which may be leveraged in various aspects of the present systems and methods for digital retirement of IHS 100, in accordance with embodiments of the present systems and methods, as discussed below.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 105 as a systems-on-a-chip (SoC).

A person of ordinary skill in the art will appreciate that IHS 100 is merely illustrative and is not intended to limit the scope of the disclosure described herein. In particular, any computer system and/or device may include any combination of hardware or software capable of performing certain operations described herein. In addition, the operations performed by the illustrated components may, in some embodiments, be performed by fewer components or distributed across additional components. Similarly, in other embodiments, the operations of some of the illustrated components may not be performed and/or other additional operations may be available.

A person of ordinary skill will recognize that IHS 100 of FIG. 1 is only one example of a system in which the certain embodiments may be utilized. Indeed, the embodiments described herein may be used in various electronic devices, such as network router devices, televisions, custom telecommunications equipment for special purpose use, etc. That is, certain techniques described herein are in no way limited to use with the IHS of FIG. 1.

As noted above, existing approaches for IHS retirement involves handing the IHS over to another party that performs IHS sanitization(s,) presenting (a) risk(s), and potential threat(s), in that the owner cannot assure that the third party has performed its own checks on (e.g., monitored) extracting the data, or even that (someone associated with) the third party company will not publish or sell the data. Further, there is no way for the IHS owner to validate that the third party company's sanitization process is thorough, which requires a high level of knowledge in the industry.

Embodiments of the present systems and methods provide a "Zero-IT" approach since the location of IHSs (e.g., servers) can be anywhere, such as in the middle of an ocean, or other hard-to-reach location. Additionally, embodiments of the present systems and methods provide and ability to manage our an IHS "fleet" securely during the entire life cycle of the device(s). In accordance with embodiments of the present systems and methods, each IHS has integrated security mechanism which will allow an official retiring process of the IHS, securely, and permanently. Embodiments of the present systems and methods are secure, by design, and easy to implement. Embodiments of the present systems and methods for secure and permanent digital retirement of IHSs are based on a Zero-IT approach with high confidence that the system is retired, in a long-lasting fashion, and that the retired IHS cannot be employed as a rogue device, in any fashion. Moreover, under embodiments of the present systems and methods, any residual data is destroyed, as well. Embodiments of the present systems and methods, thereby, provide General Data Protection Regulation (GDPR) compliance by destroying potential residual customers data, as well. (GDPR is a regulation in EU law on data protection and privacy in the European Union and the European Economic Area.) The foregoing is achieved by implementing an encryption-based sanitization and strict and managed approval process on an IHS management platform, in accordance with embodiments of the present systems and methods.

Under embodiments of the present systems and methods for IHS secured digital retirement, the IHS will be enabled to retire securely and permanently via the following Zero IT approach, and no residual data will be left on the IHS (e.g., IHS Discs, TPM, memory, etc.) and the IHS will not be useable as a rogue device by a hostile factor. To securely retire the IHS from an organization ecosystem, without IT team's involvement, embodiments of the present systems and methods integrate between management and functional processes of the IHS. The management process employed in accordance with embodiments of the present systems and methods is implemented on a IHS management platform. This (completely) separates the IHS's main functionality versus the place where configurations are implemented in accordance with embodiments of the present systems and methods.

In accordance with embodiments of the present systems and methods, the digital retirement process is divided into two parts, for security reasons. This will prevent a potential attacker implementing an entire, or End-To-End, attack from the same system or location. For example, to penetrate the present process(es), an attacker would be required to break a multi-layer security control mechanism, within the IHS, which leaves a separated environment, network, management platform and management users (located in external Identity provider and MFA), isolated from the attack.

In accordance with various embodiments IHS digital retirement in accordance with embodiments of the present systems and methods starts with a first person, "Person 1," who may be authenticated using Multi-Factor Authentication (MFA) initiating digital retirement of the IHS, which can be approved by a second person, "Person 2," who may be authenticated using MFA. Thereby, embodiments of the present systems and methods use a "2 Personnel Rule" to achieve final approval. Only then, will the IHS enter into a "Retirement Mode." In some embodiments, the number of IHSs which can be entered into digital retirement at the same time (i.e., within a predefined time frame) may be limited in accordance with embodiments of the present systems and methods, in order to protect the system against abuse. Only after the approval process is completed, is a command to digitally retire the IHS sent, securely, to the indicated IHS.

The digital retirement task thusly initiated may be fully automatic or semi-automatic. In fully automatic IHS digital retirement, after the IHS receives the digital retirement command, embodiments of the present systems and methods retire the IHS automatically. In semi-automatic IHS digital retirement, the IHS requires a final approval on (at) the IHS.

Under embodiments of the present systems and methods an IHS has a unique data sanitization key, which may be a 256-bit encryption key, stored, protected, immutable and unreadable to external devices, in the TPM controller chip. This data sanitization key is, in accordance with embodiments of the present systems and methods, stored in the TPM, such as at time of manufacture of the IHS or (and) at time of manufacture of the TPM (controller (chip)). When the command for digital retirement of the IHS is accepted by the IHS, the IHS will check whether it is configured to automatically retire (i.e., implement the fully automatic procedure) or wait for final approval (i.e., implement the semi-automatic procedure).

Once the IHS is in "retirement mode," the IHS is commanded to use the IHS's TPM hosted unique data sanitization key (which is a private encryption key) to encrypt all the IHS data storage devise(s) and any other data on the IHS. Embodiments of the present systems and methods use this (new) key to eliminate additional malicious capabilities in case any (original) keys on the data storage device(s) are compromised (e.g., were stolen). The process may then verify that all the data has been encrypted successfully. Then, in accordance with embodiments of the present systems and methods, the IHS's power supply may have a unique connection to the TPM chip, which may be used to "kill" the TPM chip to destroy the unique data sanitization key, or the unique data sanitization key is otherwise removed. Using the IHS's power supply to destroy the TPM controller chip will destroy the root-of-trust of the IHS and the key (i.e., the unique data sanitization key) used for the encryption of the discs. By destroying the root-of-trust, the IHS can no longer boot and hence, cannot be used as a rogue device if it falls into hostile hands. Additionally, this will provide compliance with GDPR requirements, which may mitigate any associated fines or other enforcement action against the organization owning the IHS (from regulatory bodies). In short, consequently, the IHS is retired according to any security requirements.

Consistent with the foregoing, the digital retirement command may be considered an "unreversible command," which when executed in an IHS may cause permanent damage. Embodiments of the present systems and methods may implement an additional secondary security layer (e.g., pre-approval) of unreversible commands Therefore, commands such as these may, in accordance with embodiments of the present systems and methods, be required to be double verified. Embodiments of the present systems and methods add a layer of pre-approval steps for the verification of the inputted unreversible command. Rather than executing the unreversible (digital retirement) command immediately, embodiments of the present systems and methods add two additional approval steps via two different pre-defined authorities. This will allow for a verification procedure so that unreversible commands will not be executed, mistakenly. Thereby, embodiments of the present systems and methods may provide remotely pre-approval steps for allowing execution of unreversible commands in an IHS. Thus, preventing permanent damage to the IHS system. Use of such remote pre-approval steps will elevate the availability assurance of the IHS, allowing business continuity to not be impacted.

Figure 2:
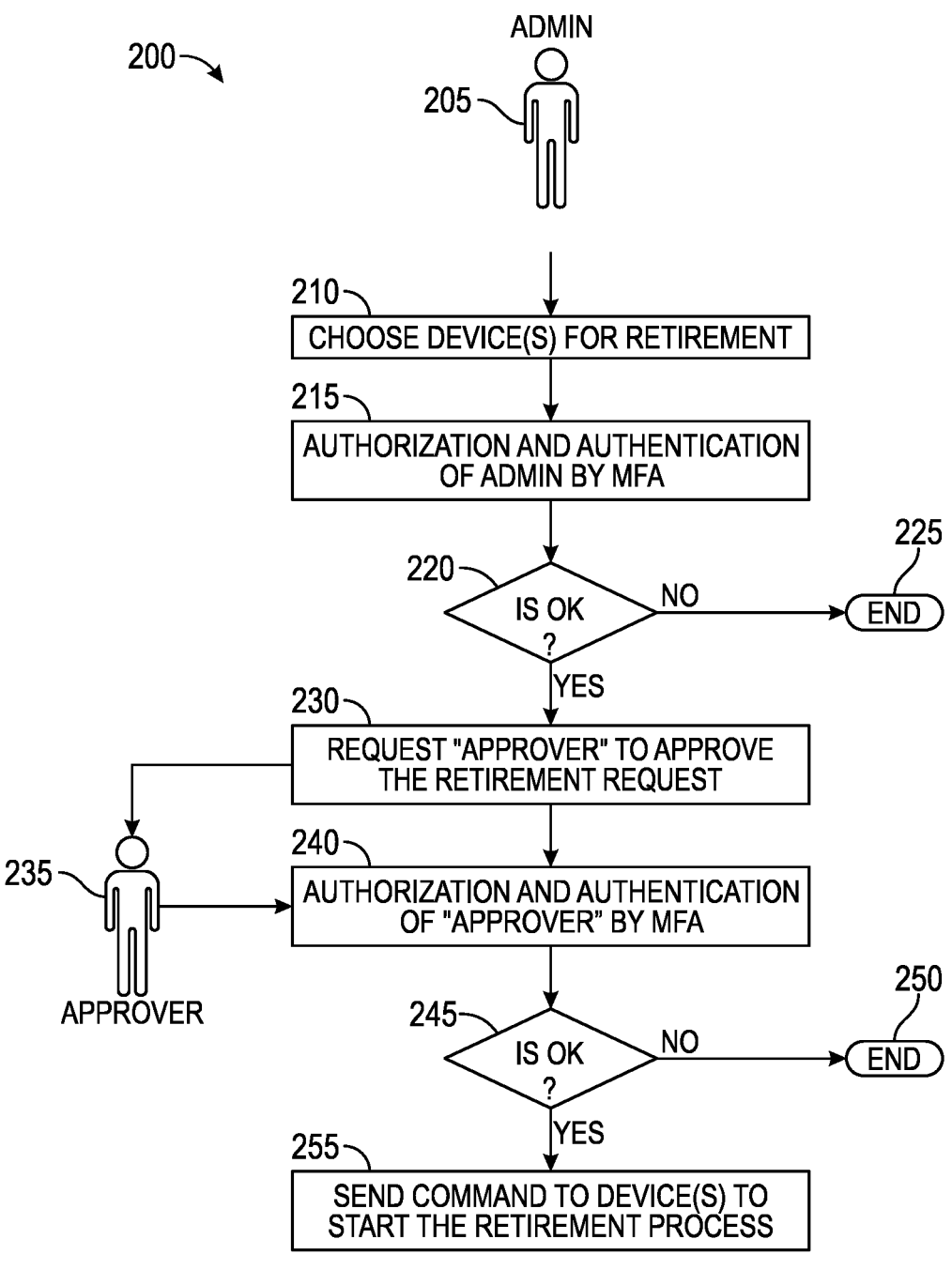
FIG. 2 is a diagrammatic flowchart of an example approval stage process for initiation of digital retirement of an IHS from a remote management location, according to some embodiments.

FIG. 2 is a diagrammatic flowchart of example approval stage process 200 for initiation of digital retirement of an IHS (100) from a remote management location, according to some embodiments. Therein, IHS (administrative) first user 205 may, at 210 select the IHS (100) for digital retirement, the selection of which is received by, for example, the IHS's remote access controller (135), or the like, (at 210). At 215, (administrative) user 205 is authorized and/or authenticated, such as by operation of the remote access controller, such as through MFA. If it is determined, at 220, that the (administrative) user is not authorized or authenticated process 200 ends at 225. However, if it is determined, at 220, that the (administrative) user is authorized and/or authenticated, the remote access controller, or the like, may, at 230, request that a second ("approver") user approve the selection of the IHS for digital retirement.

Requested (approver) second user 235 is, upon approver) second user 235 approving selection of the IHS (100) for digital retirement (from 210), authorized and/or authenticated at 240, such as by, or through, the IHS's remote access controller (135), or the like, through the use of MFA, or the like. If it is determined, at 245, that second (approver) user 235 is not authorized or authenticated process 200 ends at 250. However, if it is determined, at 245, that the (approver) user is authorized and/or authenticated, the remote access controller, or the like, may, at 255, send, a digital retirement command to the selected IHS, in response to approval of the selection of the IHS for digital retirement by the second (approve) user, at 240.

The various embodiments of the present systems and methods for digital retirement of an IHS, primarily include, the IHS encrypting all data stored, or otherwise present on the IHS, using an encryption key (e.g., the unique data sanitization key) stored only in (i.e., protected, immutable and unreadable to external devices in) a TPM (controller (chip)) of the IHS, and incapacitating, spiking, killing, destroying, or the like, the TPM (controller (chip)) (i.e., preventing the TPM (controller (chip)) from functioning). Thusly, following the remote IHS selection approval for digital retirement process sending the digital retirement command at 255, or the like, digital retirement of the selected IHS takes pace, such as via process 300, of FIG. 3.

Figure 3:
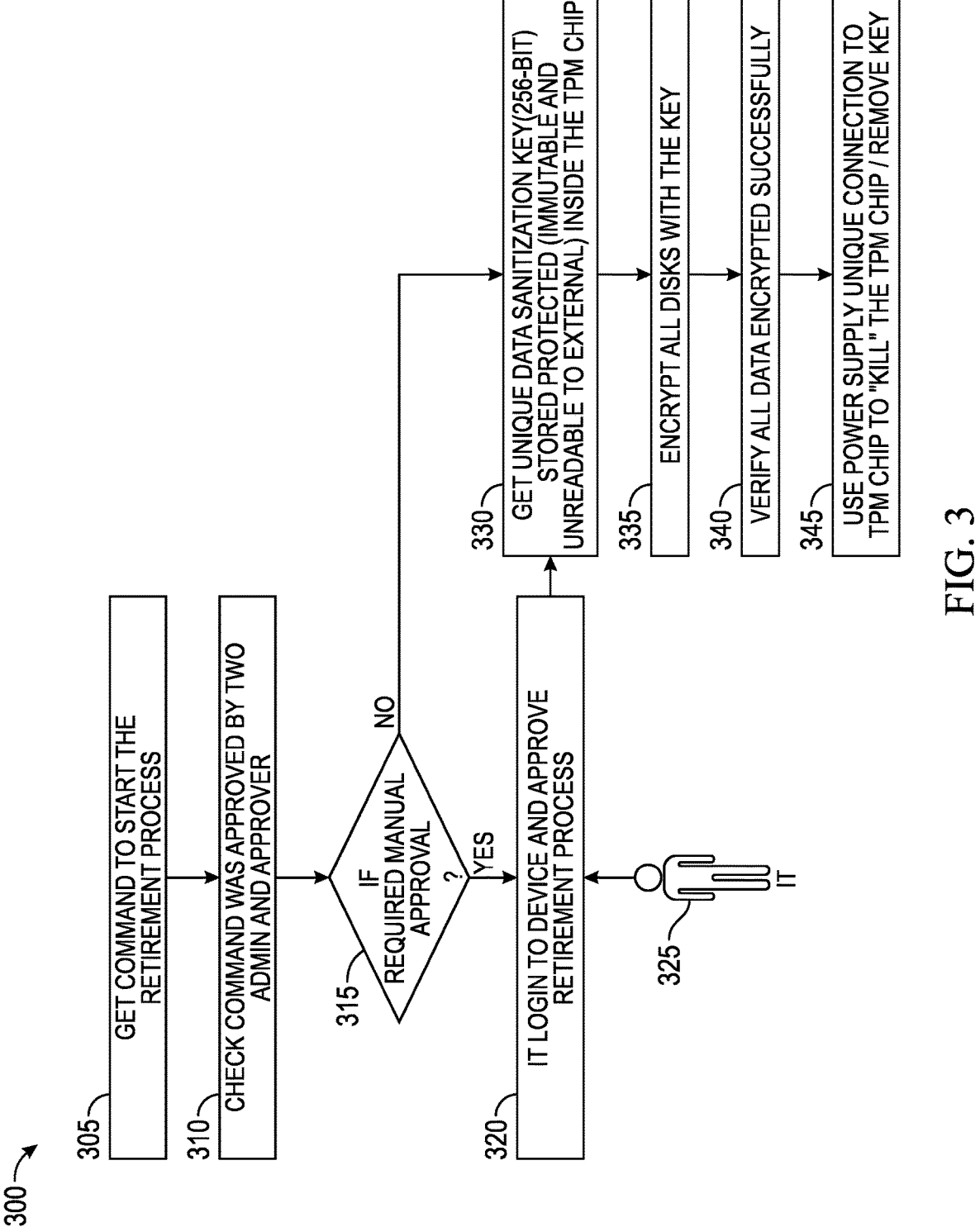
FIG. 3 is a diagrammatic flowchart of an example, IHS-executed, process for digital retirement of the IHS, according to some embodiments.

FIG. 3 is a diagrammatic flowchart of example, IHS-executed, process 300 for digital retirement of the IHS, according to some embodiments. Therein, the IHS (100) selected for retirement (such as, at 210) receives, or otherwise retrieves, a digital IHS retirement command (such as, sent at 255) at 305. At 310, the IHS confirms that the selection of the IHS for digital retirement was approved by a(n) (admin) first user and a second (approver) user.

Embodiments of the present systems and methods also provide options for an additional physical-approval security layer for remote unreversible commands, such as the digital IHS retirement command. As noted, such unreversible commands which are executed in IHSs may cause permanent damage to the IHS. Therefore, in accordance with some embodiments these commands may require to have IT personnel provide verification and validation of the command, pre-execution. Various embodiments of the present systems and methods may (optionally) add an additional command pre-execution security layer via a physical presence of an IT personnel for validation purposes. This may facilitate standing in regulatory compliance, such as by providing rigid constraint requirements, such as physical approval. To such ends, embodiments of the present systems and methods may add a physical approval step for validation purposes of unreversible commands. This will allow for a physical verification and validation procedure, so that unreversible commands will not be executed, mistakenly, alongside standing with regulatory compliance standards. To such ends, embodiments of the present systems and methods, such as described herein in implementing digital IHS retirement, may include the above steps to provide pre-approval of the unreversible command execution remotely, and the steps described below for on premise login to the IHS and on premise, secondary approval of the unreversible command execution. This physical presence of IT personnel for validation of pre-execution step of unreversible commands for an IHS, may thusly, prevent permanent, unintended, damage to the IHS. By using such a physical pre-execution validation step business continuity and growth to other sectors via standing with regulatory compliance requirements for physical-control approval may be enabled.

At 315 a determination is made, by the IHS as to whether manual approval of the retirement process is required (such as manually, at the IHS, itself) for digital retirement of the IHS to proceed. Such manual approval may be required in the case where the semi-automatic process is chosen, with IT approval in (at) the IHS. This section of the semi-automatic process may be made for the IHS at a manufacturing level, or maybe a user (owner) selectable option, or the like. In any case, the setting of whether manual approval is required (semi-automatic process enabled) is predetermined with respect to the determination made at 315. If it is determined at 315 that such manual approval of the retirement process is required (at the IHS) for digital retirement of the IHS to proceed, then at 320, (IT) third user 325 is authorized and/or authenticated, such as by the IHS, such as through MFA. In response to receipt, by the IHS, of the manual approval of retirement of the IHS for retirement from the (IT)] third user (at the IHS), or if it is determined at 315 that such manual approval of the digital retirement process is not required (i.e., that the digital retirement process is automatic), digital retirement of the IHS proceeds, starting at 330.

Since digital retirement of the IHS is an unreversible command, which if mistakenly executed in the IHS will cause permanent damage, some embodiments of the present systems and methods may make use of simultaneous authentication via a disk-on-key (DOK) pair at 320, authorization and/or authenticated of (IT) third user 325, for execution of the unreversible digital retirement command discussed below. In accordance with such embodiments, execution of such an unreversible command may call for IT personnel verification and validation of the command, pre-execution, alongside adding another physical protection layer for authentication purposes using a pair of disk-on-keys, simultaneously. Thus, at 320 a final approval step, for executing the unreversible (retirement) command may be added, where the unreversible (retirement) command s acknowledged by IT personnel 325, but is also authenticated with a set of physical components and its authentication methodology with the IHS, simultaneously. Thus, in order to eliminate a "human-factor" margin mistake or a malicious actor, such embodiments of the present systems and methods place an in-depth integrity (Confidently, Integrity and Availability (CIA) triad model) verification step to the retirement functionality, which is a very sensitive operation, alongside the above-described digital retirement initiation process(s). These embodiments employ an MFA methodology where the external devices are authenticated via physical interaction with the IHS and its TPM for final approval step to execute unreversible commands, such as the present digital retirement command. This enables simultaneous authentication via a disk-on-key pair procedure, as the final step to initiate digital retirement of the IHS—so that unreversible commands will not be executed, mistakenly or in purpose by malicious actor, alongside with the above-mentioned unique MFA methodology.

For deployment, at the time of manufacture of the IHS the serial numbers of a pair of DOKs are flashed to the IHS's TPM, which is correlated to the specific Motherboard serial number of the IHS. IHS USB slot numbers to be assigned in accordance herewith are also flashed to the TPM. Approval phase of these embodiments, such as at 320 above, is carried out, on-site, on the IHS. Whereby, an IT personnel (325) connects the two DOKs, simultaneously, to the pre-registered slots to the IHS. The IHS performs a verification procedure where the DOKs' serials numbers and the specific slots are examined and validated via the TPM. If the serial numbers and slot numbers are thusly verified and validated, the unreversible command is executed, for example, per below, with respect to a digital retirement command, starting at 330. Thereby, in accordance with such embodiments, physical presence of IT personnel with a MFA methodology, alongside a sensitive functionality integrity validation process, may eliminate mistaken, or malicious, insider threat, preventing permanent damage to the IHS, while allowing execution of unreversible commands in a secured fashion in an IHS.

Some embodiments of the present systems and methods may alternatively, or additionally make use of a pre-defined root-of-trust with security attributes for unreversible IHS commands, which as noted, can cause permanent damage. In these embodiments, execution of unreversible commands may be dependent on IT personnel for verification and validation of the command, pre-execution, alongside having security attributes limitation set in place. Such security attributes for the unreversible command may include, by way of example an expiration date of root permission from an issuing date, shorten time to live for initial engagement with the IHS, a list of commands allowed on the IHS, etc. Such embodiments may further employ a physical token, such as may be presented via DOK, which may be produced when a pre-approval for execution of the unreversible command on the IHS is granted. This DOK may include the token alongside the security attributes and their correlated limitation. The token may be signed with a public key, or the like, which matches the targeted IHS. A matching private key for the IHS may, in accordance therewith be stored in the IHS's TPM. Such embodiments limit root-of-trust access to the IHS and narrow potential threats.

At 330, the (256-bit) (unique) data sanitization key is retrieved, such as from the TPM (controller (chip)), and at 335, all data stored, or otherwise present in the IHS is encrypted using the data sanitization key. Then at 340, the IHS verifies that all data on the IHS has been successfully encrypted. In response to verification, at 340, that all data on the IHS has been encrypted successfully, the TPM (controller (chip)) is incapacitated at 345, such as by spiking, killing, destroying, or otherwise incapacitating the TPM (controller (chip)), thereby, destroying the associated root-of-trust of the IHS and the data sanitization key itself. Such incapacitation (destruction) of the TPM (controller (chip)) and thereby the associated root-of-trust of the IHS and the data sanitization key itself may be carried out at 345 by the IHS, TPM, by way of example, instructing the power supply (175, such as via power management unit 170) to overvolt, or otherwise burnout, the IHS TPM (controller (chip)).

In accordance with the foregoing, a first IHS (e.g., a first IHS 100) may include a (first) remote access controller (135), or the like, which may be integrated into the first IHS. The remote access controller, or the like, of the first IHS may, in accordance with embodiments of the present systems and methods, be configured to receive, from a(n) (admin) first user, selection of another IHS (e.g., a second IHS 100) for digital retirement. The remote access controller, or the like, of the first IHS may authorize and/or authenticate the (admin) first user, and, in response to authorization and/or authentication of the (admin) first user, request a(n) that a(n) (approver) second user approve the selection of the selected IHS for digital retirement. The remote access controller, or the like, of the first IHS may then authorize and/or authenticate the (approver) second user, and, in response to approval of the selection of the selected IHS for digital retirement by the (approver) second user, send a digital retirement command to the selected IHS.

This digital retirement command may then be transmitted to the selected IHS, such as via a (local, public and/or private) network, or the like.

The selected IHS may have an incorporated TPM that stores an immutable unique data sanitization key unreadable by external devices. As noted, this unique data sanitization key may be stored in the TPM at time of manufacture of the selected IHS or at time of manufacture of the TPM. The selected IHS may also have a (second) remote access controller (135), or the like, which may be integrated into the selected IHS. This remote access controller, or the like, of the selected IHS may, in accordance with embodiments of the present systems and methods, be configured to, in response to receipt of the digital retirement command, encrypt data on the selected IHS, using the unique data sanitization key from the TPM, and to incapacitate the TPM. In some embodiments, the remote access controller, or the like, of the selected IHS, may verify all data on the selected IHS is encrypted successfully, prior to incapacitating the TPM. The remote access controller, or the like, of the selected IHS may incapacitate the TPM by instructing the power supply of the selected IHS to overvolt the TPM of the selected IHS.

In various embodiments, the remote access controller, or the like, of the selected IHS, may, prior to encryption of data on the selected IHS and incapacitation of the TPM of the selected IHS, in accordance with embodiments of the present systems and methods, determine if manual approval of digital retirement of the selected IHS is required. In response to a determination that manual approval of digital retirement of the selected IHS is required, the remote access controller, or the like, of the selected IHS may authorize and/or authenticate a(n) (IT) third user. The remote access controller, or the like, of the selected IHS, may carry out the encryption of data on the selected IHS using the unique data sanitization key from the TPM, and subsequent incapacitation of the TPM, in response to receipt, by the remote access controller, or the like, of the selected IHS, of manual approval of digital retirement of the selected IHS from the (IT) third user.

Embodiments of the present systems and methods provide and advances a flexible IHS retirement process, which provides control over IHSs' life cycles. "Two Personnel" simultaneous approval for retirement of device (without a recover option). Since, a digital retirement process is not recoverable, someone can mistakenly, "destroy" an IHS as part retirement request, embodiments of the present systems and methods employs (simultaneous) approval of (at least) two different authorized personnel. Implementation of this "Two Personnel Rule" provides cover each person from a mistake to occur or to be approved. Embodiments of the present systems and methods provide "digital transformation" of IHS retirement processes, through provision of remote secure IHS retirement, without physical intervention, interaction, operation, etc. by IT personnel. The present digital retirement process can be implemented, in various embodiments, remotely and is fully automatic and secure. the present systems and methods enables defining of "End-Of-Life" of an IHS in a managed process and removes the possibility of someone trying to recover the IHS and employing it as a rogue device.

Further, embodiments of the present systems and methods provide fully controlled IHS "fleet" management, such as may be required by the U.S. National Institute of Standards and Technology Cybersecurity Framework (NIST CSF), Center for Internet Security (CIS), etc., compliance with GDPR, etc. Embodiments of the present systems and methods enables full control over retired devices since embodiments of the present systems and methods provide a permanent retirement process which does not allow potential attackers to use retired IHSs as rogue devices. Thus, minimalizing the cyberattack surface (reducing attack vectors for the IHS owing organization). Embodiments of the present systems and methods, enables breaking of the "Root-of-Trust" of the digitally retired IHS. Consequently, this prevents that IHS booting again. Embodiments of the present systems and methods enables simplifying efficient compliance with GDPR requirements, and the like, and reduce the risk of fines from regulatory bodies, by destroying residual data including PII and keys on the digitally retired IHS.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices.

To implement various operations described herein, computer program code (i.e., instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks. The program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

What is claimed is:

1. A method for digital retirement of an information handling system, comprising:

providing a user of the information handling system with of access to data stored by the information handling system;

upon receipt of a digital retirement command configured to cause unreversible loss of access to data, requesting, from at least two sources independently validated based at least in part on Multi-Factor Authentication (MFA), at least two approvals for executing the digital retirement command;

upon receipt of the at least two approvals, requesting on-premise approval, at the information handling system, of the unreversible loss of access to data;

upon receipt of the on-premise approval of the unreversible loss of access to data, authenticating the digital retirement command based at least in part on a disk-on-key (DOK) pair stored in a trusted platform module of the information handling system;

upon authentication of the digital retirement command, initiating a retirement mode of operations by the information handling system;

upon entering the retirement mode, encrypting, by the information handling system, all data stored by the information handling system, using an encryption key stored in the trusted platform module; and as part of the retirement mode, incapacitating the trusted platform module such that all data stored by the information handling system is no longer recoverable.

2. The method of claim 1, wherein the encryption key is a unique data sanitization key protected inside the trusted platform module.

3. The method of claim 2, wherein the unique data sanitization key is a 256-bit encryption key.

4. The method of claim 2, wherein the encryption key protected inside the trusted platform module is immutable and unreadable by external devices.

5. The method of claim 1, further comprising verifying all data on the information handling system is encrypted successfully, prior to incapacitating the trusted platform module.

6. The method of claim 1, wherein incapacitating the trusted platform module further comprises instructing a power supply of the information handling system to overvolt the trusted platform module.

7. The method of claim 1, wherein encrypting data on the information handling system using the encryption key stored in the trusted platform module and subsequently incapacitating the trusted platform module are in response to receipt of the digital retirement command.

8. The method of claim 1, further comprising:

receiving, from a first user, by a remote access controller, selection of the information handling system for digital retirement;

authorizing and/or authenticating the first user, by the remote access controller;

requesting, by the remote access controller, that a second user approve the selection of the information handling system for digital retirement;

authorizing and/or authenticating the second user, by the remote access controller; and sending, by the remote access controller, the digital retirement command to the information handling system, in response to approval, by the second user, of the selection of the information handling system for digital retirement.

9. The method of claim 8, wherein encrypting data on the information handling system using the encryption key stored in the trusted platform module and subsequently incapacitating the trusted platform module are automatically carried out in response to receipt, by the information handling system, of the digital retirement command, and wherein the method further comprises authenticating the digital retirement command based, at least in part, on correlating a DOK pair serial number with a serial number read from an information handling system motherboard.

10. The method of claim 8 further comprising:

determining, by the information handling system, if manual approval of digital retirement of the information handling system is required;

authorizing and/or authenticating a third user, by the information handling system, in response to a determination that manual approval of digital retirement of the information handling system is required; and encrypting data on the information handling system using the encryption key stored in the trusted platform module followed by incapacitation of the trusted platform module, in response to receipt, by the information handling system from the third user, of manual approval of digital retirement of the information handling system.

11. An information handling system that comprises:

one or more processors;

one or more memory devices coupled to the one or more processors, wherein the one or more memory devices comprise stored computer-readable instructions that, upon execution by the one or more processors, cause an operating system to provide applications for access to data stored by the information handling system;

a trusted platform module incorporated into the information handling system, the trusted platform module configured to store an immutable unique data sanitization key unreadable by external devices; and a remote access controller integrated into the information handling system and configured to perform operations that comprise:

in response to receipt of a digital retirement command configured to cause unreversible loss of access to data, request, from at least two sources independently validated based at least in part on Multi-Factor Authentication (MFA), at least two approvals for execution of the digital retirement command;

upon receipt of the at least two approvals, request on-premise approval, at the information handling system, of the unreversible loss of access to data;

upon receipt of the on-premise approval of the unreversible loss of access to data, authenticate the digital retirement command based at least in part on a disk-on-key (DOK) pair stored in the trusted platform module;

upon authentication of the digital retirement command, initiate a retirement mode of operations by the information handling system;

upon entry to the retirement mode, encrypt all data stored by the information handling system, based at least in part on the immutable unique data sanitization key; and as part of the retirement mode, incapacitate the trusted platform module such that all data stored by the information handling system is no longer recoverable.

12. The information handling system of claim 11, wherein the immutable unique data sanitization key is stored in the trusted platform module at time of manufacture of the information handling system or at time of manufacture of the trusted platform module.

13. The information handling system of claim 11, wherein the remote access controller is further configured to verify all data on the information handling system is encrypted successfully, prior to incapacitation of the trusted platform module.

14. The information handling system of claim 11, wherein the remote access controller is further configured to incapacitate the trusted platform module by instruction to a power supply of the information handling system to overvolt the trusted platform module.

15. The information handling system of claim 11 wherein the remote access controller is further configured to:

determine if manual approval of selection of the information handling system for digital retirement is required for digital retirement of the information handling system;

authorize and/or authenticate a third user in response to a determination that manual approval of the selection of the information handling system for digital retirement is required; and encrypt data on the information handling system based at least in part on the immutable unique data sanitization key and subsequent incapacitation of the trusted platform module, in response to receipt, by the remote access controller, of manual approval of digital retirement of the information handling system from the third user.

16. A system that comprises:

a first information handling system that comprises a first remote access controller integrated into the first information handling system, wherein the first remote access controller is configured to perform first remote access controller operations that comprise:

receive, from a first user, selection of a second information handling system for digital retirement, wherein the second information handling system comprises one or more processors and one or more memory devices coupled to the one or more processors, the one or more memory devices configured with stored computer-readable instructions that, upon execution by the one or more processors, cause an operating system to provide a user of the second information handling system with applications for access to data stored by the second information handling system and peripheral devices coupled to the second information handling system;

authorize and/or authenticate the first user, based at least in part on Multi-Factor Authentication (MFA) of the first user;

request a second user approve the selection of the second information handling system for digital retirement, in response to the authorization and/or authentication of the first user;

authorize and/or authenticate the second user, based at least in part on MFA of the second user;

send a digital retirement command configured to cause unreversible loss of access to data to the second information handling system, in response to approval of the selection of the second information handling system for digital retirement by, and the authorization and/or authentication of, the second user, wherein the second information handling system comprises:

a trusted platform module incorporated into the second information handling system, the trusted platform module configured to store an immutable unique data sanitization key unreadable by external devices;

a second remote access controller integrated into the second information handling system and configured to perform second remote access controller operations that comprise:

in response to receipt of the digital retirement command:

request on-premise approval, at the second information handling system, of the unreversible loss of access to data;

upon receipt of the on-premise approval of the unreversible loss of access to data, authenticate the digital retirement command based at least in part on a disk-on-key (DOK) pair stored in the trusted platform module, and correlation of a serial number read from a motherboard of the second information handling system with a serial number of the DOK pair;

upon authentication of the digital retirement command, encrypt all data stored by the second information handling system, based at least in part on the immutable unique data sanitization key; and incapacitate the trusted platform module such that all data stored by the second information handling system is no longer recoverable.

17. The system of claim 16, wherein the immutable unique data sanitization key is stored in the trusted platform module at time of manufacture of the second information handling system or at time of manufacture of the trusted platform module.

18. The system of claim 16, wherein the second remote access controller integrated into the second information handling system is further configured to verify all data on the second information handling system is encrypted successfully, prior to incapacitation of the trusted platform module.

19. The system of claim 16, wherein the second remote access controller integrated into the second information handling system is further configured to incapacitate the trusted platform module by instruction to a power supply of the second information handling system to overvolt the trusted platform module.

20. The system of claim 16 wherein the second remote access controller integrated into the second information handling system is further configured to, prior to encryption of data on the second information handling system and incapacitation of the trusted platform module:

determine if manual approval of digital retirement of the second information handling system is required;

authorize and/or authenticate a third user in response to a determination that manual approval of digital retirement of the second information handling system is required; and carry out the encryption of data on the second information handling system based at least in part on the immutable unique data sanitization key and subsequent incapacitation of the trusted platform module, in response to receipt, by the second remote access controller integrated into the second information handling system, of manual approval of digital retirement of the second information handling system from the third user.

* * * * *